United States Patent
Goto et al.

(10) Patent No.: US 8,654,730 B2
(45) Date of Patent: Feb. 18, 2014

(54) WIRELESS COMMUNICATION SYSTEM, BASE STATION, MOBILE STATION, BASE STATION CONTROL PROGRAM, AND MOBILE STATION CONTROL PROGRAM

(75) Inventors: Jungo Goto, Osaka (JP); Yasuhiro Hamaguchi, Osaka (JP); Kazunari Yokomakura, Osaka (JP); Osamu Nakamura, Osaka (JP); Hiroki Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 61 days.

(21) Appl. No.: 13/377,474

(22) PCT Filed: Apr. 23, 2010

(86) PCT No.: PCT/JP2010/057260
§ 371 (c)(1),
(2), (4) Date: Dec. 13, 2011

(87) PCT Pub. No.: WO2010/143477
PCT Pub. Date: Dec. 16, 2010

(65) Prior Publication Data
US 2012/0093114 A1 Apr. 19, 2012

(30) Foreign Application Priority Data
Jun. 12, 2009 (JP) .................................. 2009-141141

(51) Int. Cl.
*H04W 52/30* (2009.01)
*H04W 72/04* (2009.01)
(52) U.S. Cl.
USPC ........................................................ 370/329
(58) Field of Classification Search
USPC ..................... 370/254–340; 709/201–213
See application file for complete search history.

(56) References Cited

U.S. PATENT DOCUMENTS 5,914,950 A * 6/1999 Tiedemann et al. ........... 370/348
5,923,650 A * 7/1999 Chen et al. .................... 370/331
(Continued)

FOREIGN PATENT DOCUMENTS

JP 11-205279 A 7/1999
JP 2007-151059 A 6/2007
(Continued)

OTHER PUBLICATIONS

Sharp, "Uplink Multiple Access Scheme for LTE-Advanced", 3GPP TSG RAN WG1 Meeting #54, R1-082787, Jeju Island Korea, Aug. 18-22, 2008.
(Continued)

*Primary Examiner* — Ayaz Sheikh
*Assistant Examiner* — Debebe Asefa
(74) *Attorney, Agent, or Firm* — Birch, Stewart, Kolasch & Birch, LLP

(57) ABSTRACT

A wireless communication system which includes a base station and a mobile station and in which the mobile station performs data transmission to the base station by allocating a transmission signal converted into a frequency signal to contiguous frequency bands or non-contiguous frequency bands divided into a predetermined number, wherein, when retransmission occurs in the data transmission the mobile station has performed by allocating the transmission signal converted into the frequency signal into the non-contiguous frequency bands, the base station determines a transmission power headroom of the mobile station in the allocation of the transmission signal to the non-contiguous frequency bands, and, if a result of the determination shows that there is not a transmission power headroom, the base station instructs the mobile station to allocate the transmission signal to the contiguous frequency bands and to perform the retransmission by increasing transmission power.

13 Claims, 10 Drawing Sheets

(56) References Cited

U.S. PATENT DOCUMENTS

| | | |
|---|---|---|
| 7,826,346 B2 | 11/2010 | Seki et al. |
| 8,284,732 B2 * | 10/2012 | Nimbalker et al. ........... 370/330 |
| 8,391,196 B2 * | 3/2013 | Gorokhov et al. ............ 370/311 |
| 2003/0095495 A1 | 5/2003 | Hou |
| 2006/0114813 A1 | 6/2006 | Seki et al. |
| 2008/0159184 A1 | 7/2008 | Niwano |
| 2009/0147748 A1 | 6/2009 | Ofuji et al. |
| 2009/0175369 A1 | 7/2009 | Atarashi et al. |
| 2009/0175374 A1 | 7/2009 | Seki et al. |
| 2011/0064044 A1 | 3/2011 | Ofuji et al. |

FOREIGN PATENT DOCUMENTS

| | | |
|---|---|---|
| JP | 2007-214824 A | 8/2007 |
| WO | WO 2005/004376 A1 | 1/2005 |
| WO | WO 2006/082664 A1 | 8/2006 |

OTHER PUBLICATIONS

"3rd Generation Partnership Project; Technical Specification Group Radio Access Network; Evolved Universal Terrestrial Radio Access (E-UTRA); Physical Channels and Modulation (Release 8)," 3GPP TS 36.211, V8.6.0, Mar. 2009, pp. 1 to 83.

* cited by examiner

WIRELESS COMMUNICATION SYSTEM, BASE STATION, MOBILE STATION, BASE STATION CONTROL PROGRAM, AND MOBILE STATION CONTROL PROGRAM

TECHNICAL FIELD

The present invention relates to a wireless communication system, a base station, a mobile station, a base station control program, and a mobile station control program, each of which performs retransmission processing in wireless communication.

BACKGROUND ART

The LTE (Long Term Evolution) system, which is the 3.9th generation wireless communication system for a mobile phone, employs HARQ (Hybrid Automatic Repeat Request) which is a retransmission control method of performing error detection of a transmission packet between a base station and a mobile station and transmitting a packet having caused an error again. This retransmission control checks a packet error by using CRC (Cyclic Redundancy Check) added to the transmission packet and transmits NACK (Negative Acknowledgement) which is a retransmission request signal when the received packet has not been able to be decoded correctly. Furthermore, ACK (Acknowledgement) which is a transmission acknowledgement signal is transmitted when the transmitted packet has been received correctly (refer to Non-patent document 1).

The retransmission control includes Non-adaptive ARQ and Adaptive ARQ. While Non-adaptive ARQ transmits data in retransmission by the same transmission method as that at the time of initial transmission, Adaptive ARQ transmits retransmission data different from that in the initial transmission by changing a parameter such as a modulation scheme, a coding rate, a puncture pattern, a frequency band width to be used, transmission power (refer to Patent document 1). Furthermore, there is proposed a method of using a plurality of antennas at the time of the retransmission, such as STTD (Space Time Transmit Diversity) and MIMO (Multiple-Input Multiple-Output) which are transmission diversity methods (refer to Patent document 2).

PRIOR ART DOCUMENT

Patent Document

Patent document 1: Japanese Patent Application Laid-Open Publication No. 2007-214824
Patent document 2: Pamphlet of International Publication No. WO2005/004376

Non-Patent Document

Non-patent document 1: 3GPP TS 36.211 (V8.6.0) "Evolved Universal Terrestrial Radio Access (E-UTRA) Physical Channels and Modulation"

DISCLOSURE OF THE INVENTION

Problem to be Solved by the Invention

However, the retransmission control by Adaptive ARQ has not been examined in consideration of a PH (Power Headroom) indicating a transmission power headroom, in a wireless communication system which enables access methods having respective peak powers different from one another to be used in an uplink, such as Clustered DFT-S-OFDM (Dynamic Spectrum Control (DSC), also called DFT-S-OFDM with SDC (Spectrum Division Control)) and DFT-S-OFDM (Discrete Fourier Transform Spread Orthogonal Frequency Division Multiplexing, also called SC-FDMA). Accordingly, in the retransmission using an access method requiring a high peak power, there is a problem in which a user without having room for PH such as a cell-edge user cannot further increase the transmission power and a base station cannot receive data correctly.

The present invention has been achieved in view of such a situation, and aims at providing a wireless communication system, a base station, a mobile station, a base station control program, and a mobile station control program, which control an access method, a transmission power, an antenna to be used, and the number of antennas in consideration of the PH indicating a transmission power headroom.

Means for Solving the Problem (1) For achieving the above object, the present invention employs the following measures. That is, a wireless communication system of the present invention is configured with a base station and a mobile station and performs wireless communication by selecting any one of a plurality of access methods having respective peak powers different from one another, wherein, when retransmission occurs in the access method used by the mobile station, the base station selects an access method having a lower peak power than the access method and also instructs the mobile station to perform the retransmission by increasing transmission power.

In this manner, when the retransmission occurs in the access method used by the mobile station, the base station selects an access method having a lower peak power than the access method and also instructs the mobile station to perform the retransmission by increasing the transmission power, and thus the mobile station can avoid a transmission power shortage and perform the retransmission with a sufficient transmission power. This results in an improvement of a cell throughput.

(2) A wireless communication system of the present invention which is configured with a base station and a mobile station and in which the mobile station performs data transmission to the base station by allocating a transmission signal converted into a frequency signal to contiguous frequency bands or non-contiguous frequency bands divided into a predetermined number, wherein, when retransmission occurs in the data transmission the mobile station has performed by allocating the transmission signal converted into the frequency signal to the non-contiguous frequency bands, the base station determines a transmission power headroom of the mobile station in the allocation of the transmission signal to the non-contiguous frequency bands, and, if a result of the determination shows that there is not a transmission power headroom, the base station instructs the mobile station to allocate the transmission signal to the contiguous frequency bands and to perform the retransmission by increasing transmission power.

In this manner, when the retransmission occurs in the data transmission the mobile station has performed by allocating the transmission signal converted into the frequency signal to the non-contiguous frequency bands, the base station determines a transmission power headroom of the mobile station in the allocation of the transmission signal to the non-contiguous frequency bands, and, if a result of the determination shows that there is not a transmission power headroom, instructs the mobile station to allocate the transmission signal to the contiguous frequency bands and to perform the retransmission by increasing the transmission power, and thus it is possible to suppress the increase of the retransmission due to a shortage of the transmission power in the mobile station and to improve the cell throughput.

(3) Furthermore, in the wireless communication system of the present invention, the mobile station performs the retransmission by increasing the transmission power by an amount corresponding to a transmission power headroom generated by the allocation of the transmission signal to the contiguous frequency bands.

In this manner, the mobile station performs the retransmission by increasing the transmission power by an amount corresponding to a transmission power headroom generated by the allocation of the transmission signal to the contiguous frequency bands, and thus the mobile station can avoid a transmission power shortage and perform the retransmission with a sufficient transmission power. This results in the improvement of the cell throughput.

(4) Furthermore, in the wireless communication system of the present invention, the mobile station allocates the transmission signal to the contiguous frequency bands and also performs the retransmission by increasing the transmission power by a predetermined amount.

In this manner, the mobile station allocates the transmission signal to the contiguous frequency bands and also performs the retransmission by increasing the transmission power by a predetermined amount, and thus the base station needs not notify the mobile station of control information of the transmission power at the time of the retransmission and the mobile station can avoid a transmission power shortage and perform the retransmission with a sufficient transmission power. This results in the improvement of the cell throughput.

(5) Furthermore, in the wireless communication system of the present invention, the mobile station has a plurality of antennas and the base station instructs the mobile station to allocate the transmission signal to the contiguous frequency bands and to perform the retransmission by using an antenna having a high channel gain among the plurality of antennas included in the mobile station and by increasing the transmission power.

In this manner, the mobile station includes a plurality of antennas and the base station instructs the mobile station to allocate the transmission signal to the contiguous frequency bands and to perform the retransmission by using an antenna having a high channel gain among the plurality of antennas included in the mobile station and by increasing the transmission power, and thus the base station can suppress the increase of the retransmission due to a shortage of the transmission power in the mobile station and improve the cell throughput by an antenna diversity effect.

(6) Furthermore, in the wireless communication system of the present invention, the base station determines an increase amount of the transmission power based on a channel gain of the antenna to be used at the time of the retransmission.

In this manner, the base station determines an increase amount of the transmission power based on a channel gain of an antenna used at the time of the retransmission, and thus the base station can set the transmission power flexibly in accordance with the channel gain of the antenna used in the mobile station.

(7) Furthermore, in the wireless communication system, the mobile station has a plurality of antennas, and the base station determines the number of antennas to be used at the time of the retransmission among the plurality of antennas included in the mobile station and instructs the mobile station to allocate the transmission signal to the contiguous frequency bands and to perform the retransmission by using a determined number of antennas and by increasing the transmission power.

In this manner, the mobile station has a plurality of antennas and the base station determines the number of antennas to be used at the time of the retransmission among the plurality of antennas included in the mobile station and instructs the mobile station to allocate the transmission signal to the contiguous frequency bands and to perform the retransmission by using a determined number of antennas and by increasing the transmission power, and thus the base station can suppress the increase of the retransmission due to a shortage of the transmission power in the mobile station and improve the cell throughput by the transmission diversity effect.

(8) Furthermore, in the wireless communication system of the present invention, the mobile station performs the retransmission by increasing the transmission power larger than a total power at the time of initial transmission by an amount corresponding to a transmission power headroom generated by the allocation of the transmission signal to the contiguous frequency bands and by using a determined number of antennas.

In this manner, the mobile station performs the retransmission by increasing the transmission power larger than a total power at the time of the initial transmission by an amount corresponding to a transmission power headroom generated by the allocation of the transmission signal to the contiguous frequency bands and by using a determined number of antennas, and thus the mobile station can suppress the increase of the retransmission due to a shortage of the transmission power.

(9) A base station of the present invention is applied to a wireless communication system which is configured with the base station and a mobile station and in which the mobile station performs data transmission to the base station by allocating a transmission signal converted into a frequency signal to contiguous frequency bands or non-contiguous frequency bands divided into a predetermined number, wherein, when retransmission occurs in the data transmission the mobile station has performed by allocating the transmission signal converted into the frequency signal to the non-contiguous frequency bands, the base station determines a transmission power headroom of the mobile station in the allocation of the transmission signal to the non-contiguous frequency bands, and, if a result of the determination shows that there is not a transmission power headroom, the base station instructs the mobile station to allocate the transmission signal to the contiguous frequency bands and to perform the retransmission by increasing transmission power.

In this manner, when the retransmission occurs in the data transmission the mobile station has performed by allocating the transmission signal converted into the frequency signal to the non-contiguous frequency bands, the base station determines a transmission power headroom of the mobile station in the allocation of the transmission signal to the non-contiguous frequency bands, and, if a result of the determination shows that there is not a transmission power headroom, the base station instructs the mobile station to allocate the transmission signal to the contiguous frequency bands and to perform the retransmission by increasing the transmission power, and thus the base station can suppress the increase of the retransmission due to a shortage of the transmission power in the mobile station and can improve the cell throughput.

(10) A mobile station of the present invention is applied to a wireless communication system which is configured with a base station and the mobile station and in which the mobile station performs data transmission to the base station by allocating a transmission signal converted into a frequency signal to contiguous frequency bands or non-contiguous frequency bands divided into a predetermined number, wherein the mobile station performs retransmission to the base station by increasing transmission power by an amount corresponding to a transmission power headroom generated by the allocation of the transmission signal to the contiguous frequency bands.

In this manner, the mobile station performs the retransmission to the base station by increasing the transmission power by an amount corresponding to a transmission power headroom generated by the allocation of the transmission signal to the contiguous frequency bands, and thus the mobile station can avoid a shortage of the transmission power and perform the retransmission with a sufficient transmission power. This results in the improvement of the cell throughput.

(11) A base station control program of the present invention is applied to a wireless communication system which is configured with a base station and a mobile station and in which the mobile station performs data transmission to the base station by allocating a transmission signal converted into a frequency signal to contiguous frequency bands or non-contiguous frequency bands divided into a predetermined number, wherein, when retransmission occurs in the data transmission the mobile station has performed by allocating the transmission signal converted into the frequency signal to the non-contiguous frequency bands, the base station control program converts a series of processing steps into a command in a manner a computer can read and execute the command, the series of processing steps including processing of determining a transmission power headroom of the mobile station in the allocation of the transmission signal to the non-contiguous frequency bands, and, if a result of the determination shows that there is not a transmission power headroom, includes processing of instructing the mobile station to allocate the transmission signal to the contiguous frequency bands and to perform the retransmission by increasing transmission power.

In this manner, when the retransmission occurs in the data transmission the mobile station has performed by allocating the transmission signal converted into the frequency signal to the non-contiguous frequency bands, the series of processing, which includes the processing of determining a transmission power headroom of the mobile station in the allocation of the transmission signal to the non-contiguous frequency bands, and, if a result of the determination shows that there is not a transmission power headroom, the processing of instructing the mobile station to allocate the transmission signal to contiguous frequency bands and to perform the retransmission by increasing the transmission power, is converted into a command in a manner a computer can read and execute the command, and thus it is possible to suppress the increase of the retransmission due to a shortage of the transmission power in the mobile station and to improve the cell throughput.

(12) A mobile station control program of the present invention is applied to a wireless communication system which is configured with a base station and a mobile station and in which the mobile station performs data transmission to the base station by allocating a transmission signal converted into a frequency signal to contiguous frequency bands or non-contiguous frequency bands divided into a predetermined number, wherein the mobile station program converts processing into a command in a manner a computer can read and execute the command, the processing performing retransmission to the base station by increasing transmission power by an amount corresponding to a transmission power headroom generated by the allocation of the transmission signal to the contiguous frequency bands.

In this manner, the processing, which performs the retransmission to the base station by increasing transmission power by an amount corresponding to a transmission power headroom generated by the allocation of the transmission signal to the contiguous frequency bands, is converted into a command in a manner a computer can read and execute the command, and thus it is possible to suppress the increase of the retransmission due to a shortage of the transmission power in the mobile station and to improve the cell throughput.

Advantage of the Invention

By applying the present invention, it is possible to avoid a situation in which transmission power runs short in retransmission and data cannot be transmitted correctly, even in the case of a user present at a cell edge, and it is possible to improve cell throughput.

BEST MODES FOR CARRYING OUT THE INVENTION

The standardization of the LTE system has been almost completed and recently the standardization of LTE-A (also called LTE-Advanced, IMT-A, or the like), which is the fourth generation wireless communication system developed further from the LTE system, has been started.

An uplink (communication from a mobile station to a base station) in LTE-A is required to have a higher peak data rate than that in LTE and to have an improved spectrum efficiency. Accordingly, an improvement of a throughput by introducing a new access method and an improvement of the peak data rate by using a multiple antenna technique are being studied.

As an access method in the LTE-A system uplink, there is proposed Clustered DFT-S-OFDM which places emphasis on backward compatibility, supports DFT-S-OFDM, and further can improve the throughput. Clustered DFT-S-OFDM is an access method which selects a frequency having a high channel gain from an available band and allocates spectra noncontiguously, and thus Clustered DFT-S-OFDM can obtain a high frequency diversity effect, while requiring a higher peak power than DFT-S-OFDM, and can improve the cell throughput.

Furthermore, while an uplink in LTE system does not use a plurality of antennas at the same time, in the LTE-A system, there is being examined a method of improving the spectrum efficiency and coverage by using MIMO (Multiple-Input Multiple-Output) multiple transmission and transmission diversity which use a plurality of transmission antennas at the same time.

Hereinafter, embodiments of the present invention will be explained with reference to the drawings. While, in the following embodiments, explanation will be made only for a case in which single carrier transmissions having respective peak powers different from one another are available in a mobile station of a transmission apparatus, substantially the same retransmission method which is based on a transmission power headroom is included in the present invention also for a case in which single carrier transmission and multi-carrier transmission which have respective peak powers different from each other are available.

Figure 1:
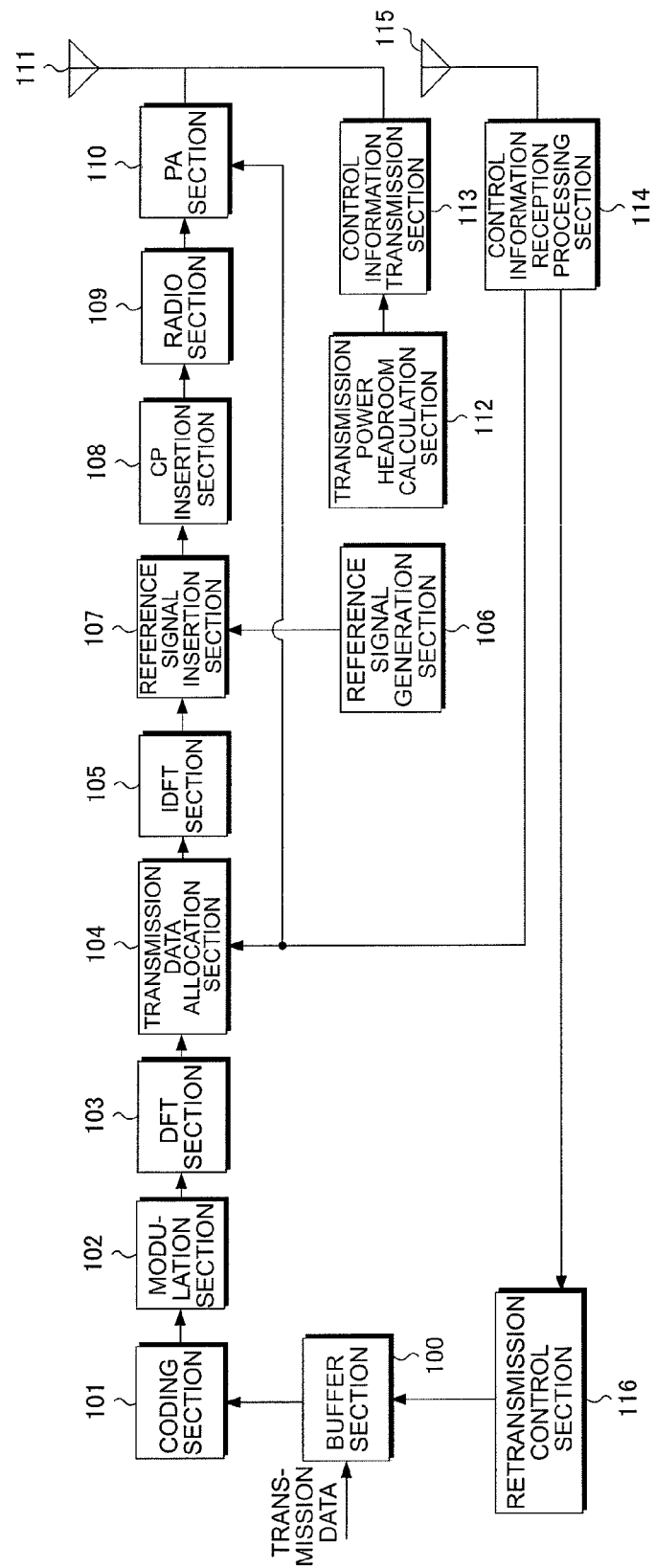
FIG. 1 is a block diagram illustrating an outline configuration example of a mobile station according to a first embodiment.

FIG. 1 is a block diagram illustrating an outline configuration example of a mobile station according to a first embodiment. The mobile station is provided with a buffer section 100, a coding section 101, a modulation section 102, a DFT section 103, a transmission data allocation section 104, an IDFT section 105, a reference signal generation section 106, a reference signal insertion section 107, a CP insertion section 108, a radio section 109, a PA section 110, a transmission antenna 111, a transmission power headroom calculation section 112, a control information transmission section 113, a control information reception processing section 114, a reception antenna 115, and a retransmission control section 116.

The mobile station receives control information including frequency allocation information, notification of which has been received from a base station of a reception apparatus and, after having performed data transmission according to the frequency allocation information, receives a transmission acknowledgement signal, notification of which is to be received from the base station with the reception antenna 115. This transmission acknowledgement signal shows whether or not the base station has been able to decode data transmitted from the mobile station correctly, and exhibits ACK when the base station has been able to decode the data correctly and exhibits NACK when the base station has not been able to decode the data correctly. When a transmission method different from that of initial data transmission is to be used at the time of retransmission, the mobile station also receives control information such as a frequency allocation method and a transmission power. A signal received by the reception antenna 115 is input to the control information reception processing section 114.

The control information reception processing section 114 obtains the transmission acknowledgement signal and the frequency allocation information from the reception signal. The obtained transmission acknowledgement signal is input to the retransmission control section 116, and, in contrast, the frequency allocation information of the control information is input to the transmission data allocation section 104 and the transmission power information is input to the PA (Power Amplifier) section 110.

The retransmission control section 116 inputs transmission data, which has been input to the buffer section 100, to the coding section 101 when the input transmission acknowledgement signal exhibits ACK, and inputs transmission data, which is stored in the buffer and which the base station has not been able to receive correctly, to the coding section 101 when the input transmission acknowledgement signal exhibits NACK.

The transmission data input to the coding section 101 is converted into code bits provided with a error correcting code and is modulated into a modulation symbol such as QPSK (Quadrature Phase Shift Keying) and 16 QAM (16 Quadrature Amplitude Modulation) in the modulation section 102. The modulation symbols are converted into a frequency domain signal in the DFT section 103, and the transmission data allocation section 104 allocates the frequency signal based on the frequency allocation information, notification of which has been received from the base station. The IDFT (Inverse Discrete Fourier Transform) section 105 converts the frequency signals into a time domain signal. A signal generated in the reference signal generation section 106 is inserted in the reference signal insertion section 107. While the reference signal is inserted into the time domain signal in the present embodiment, the reference signal may be frequency-multiplied before the frequency signal is converted into the time domain signal in the IDFT section 105. The CP (Cyclic Prefix) insertion section 108 adds a CP to the time signal, and the time signal is up-converted into a radio frequency by the radio section 109 and transmitted from the transmission antenna 111 after having been amplified in the PA section 110 so as to have a transmission power, notification of which has been received from the base station.

Furthermore, a transmission power headroom calculated by the transmission power headroom calculation section 112 is transmitted periodically to the base station via the control information transmission section 113.

While, in the present embodiment, the retransmission is configured to start from the coding of the transmission data, the coding may not be performed again and the coded data may be stored, when a coding method, a coding rate, a constraint length, a puncture pattern, and the like to be applied are not changed. Similarly, when a modulation scheme to be applied is not changed in the modulation section, the frequency domain signal obtained by DFT may be stored.

Figure 2:
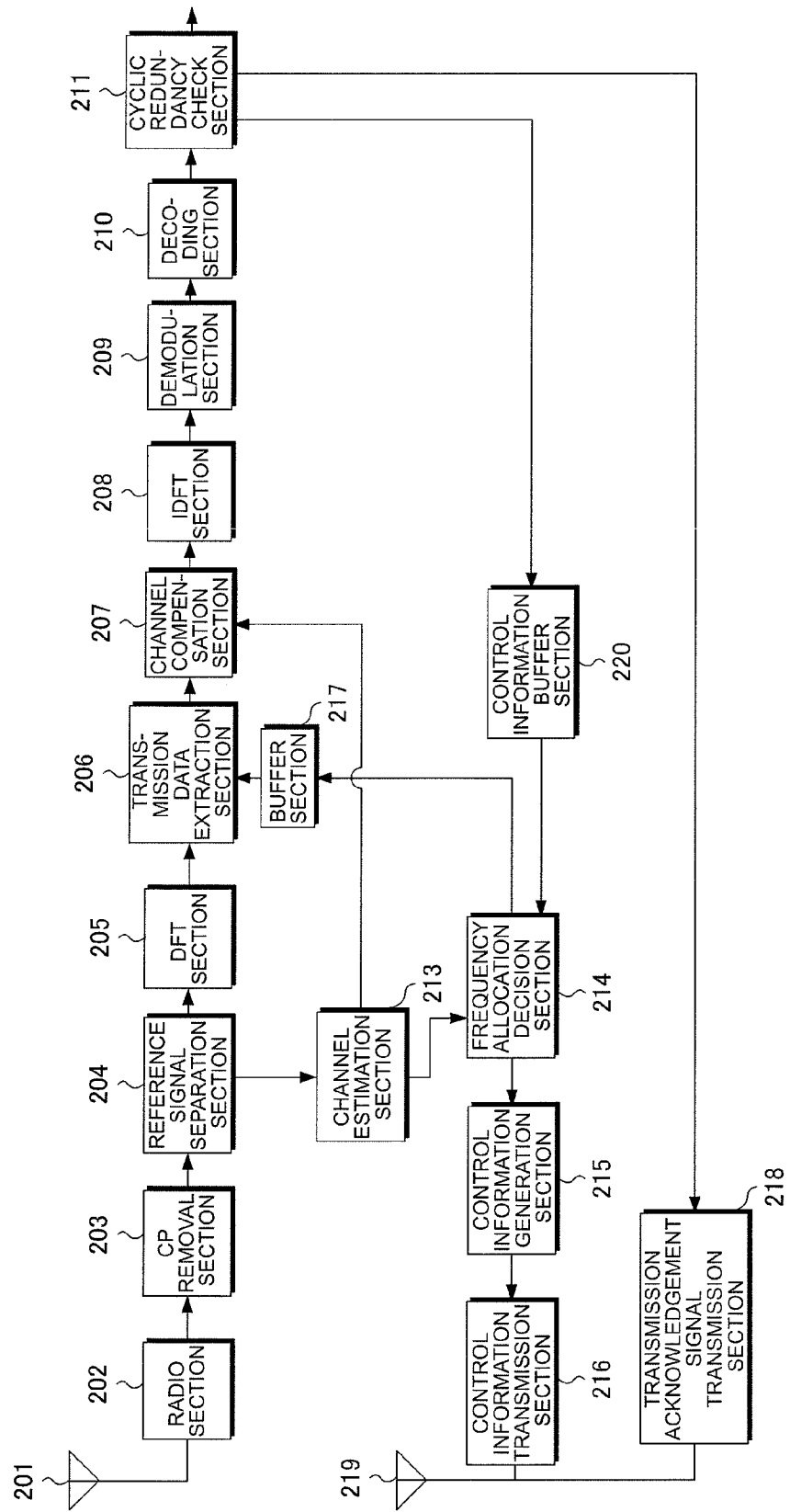
FIG. 2 is a block diagram illustrating an outline configuration example of a base station according to an embodiment of the present invention.

FIG. 2 is a block diagram illustrating an outline example of a base station according to an embodiment of the present invention. The base station is provided with a reception antenna 201, a radio section 202, a CP removal section 203, a reference signal separation section 204, a DFT section 205, a transmission data extraction section 206, a channel compensation section 207, an IDFT section 208, a demodulation section 209, a decoding section 210, a cyclic redundancy check section 211, a channel estimation section 213, a frequency allocation decision section 214, control information generation section 215, a control information transmission section 216, a buffer section 217, a transmission acknowledgement signal transmission section 218, a transmission antenna 219, and a control information buffer section 220.

The reception antenna 201 receives data or control information transmitted from the mobile station. When the data is received, the radio section 202 down-converts a signal received by the reception antenna 201 into a base band frequency, the CP removal section 203 removes the cyclic prefix, and the reference signal separation section 204 separates the reference signal. The separated reference signal is input to the channel estimation section 213 and a frequency response of a channel is estimated from the reference signal. The estimated channel information is input to the channel compensation section 207 and the frequency allocation decision section 214.

In contrast, the signal (which has been) separated from the reference signal is converted into a frequency domain signal by the DFT section 205 and the transmission data extraction section 206 extracts the transmitted data from frequencies in which the data is allocated, based on the frequency allocation information stored in the buffer section 217. The channel compensation section 207 performs processing of compensating a radio channel distortion such as multiplication of a minimum mean square error (MMSE) weight through the use of the frequency response estimated by the channel estimation section 213, and the IDFT section 208 converts the data into a time domain signal. The obtained time domain signal is broken down from the modulation symbol into reception code bits by the demodulation section 209 and is subjected to error correction decoding by the decoding section 210. The cyclic redundancy check section 211 determines whether or not the decoded data has been received correctly by using the CRC added to the transmission data.

Furthermore, when the control information is received, the control information can be obtained by the same reception processing, and when a PH is received as the control information, the PH is stored in the control information buffer section 220 to be used for retransmission control.

When the cyclic redundancy check section 211 has determined that the reception data is correct, ACK is transmitted via the transmission acknowledgement signal transmission section 218. When an error has been detected in the reception data, NACK is transmitted via the transmission acknowledgement signal transmission section 218. Furthermore, the PH information stored in the control information buffer section 220 is input to the frequency allocation decision section 214.

The frequency allocation decision section 214 determines frequency allocation based on the input channel information and the control information such as the PH, and inputs the frequency allocation to the buffer section 217 and the control information generation section 215. For the frequency allocation, it is determined based on the PH indicating a transmission power headroom whether the contiguous allocation or the non-contiguous allocation is to be used, and when there is not a transmission power headroom, the contiguous frequency allocation is used. Furthermore, frequency bands to be allocated are determined based on the channel information estimated in the channel estimation section 213. The control information generation section 215 generates the control information and the control information is transmitted from the transmission antenna 219 via the control information transmission section 216.

First Embodiment

A first embodiment is related to a retransmission method in which the mobile station performs the data transmission by using Clustered DFT-S-OFDM and the base station detects an error from a decoding result of the reception data by the CRC. There will be explained an example of switching to DFT-S-OFDM when there is not a transmission power headroom and an example of increasing the transmission power by an amount of margin for back-off, generated by the switching. While the number of the transmission antennas 111 of the mobile station is set to be one, the present embodiment can be applied when one antenna 111 is used even if the mobile station includes a plurality of antennas 111.

Figure 3:
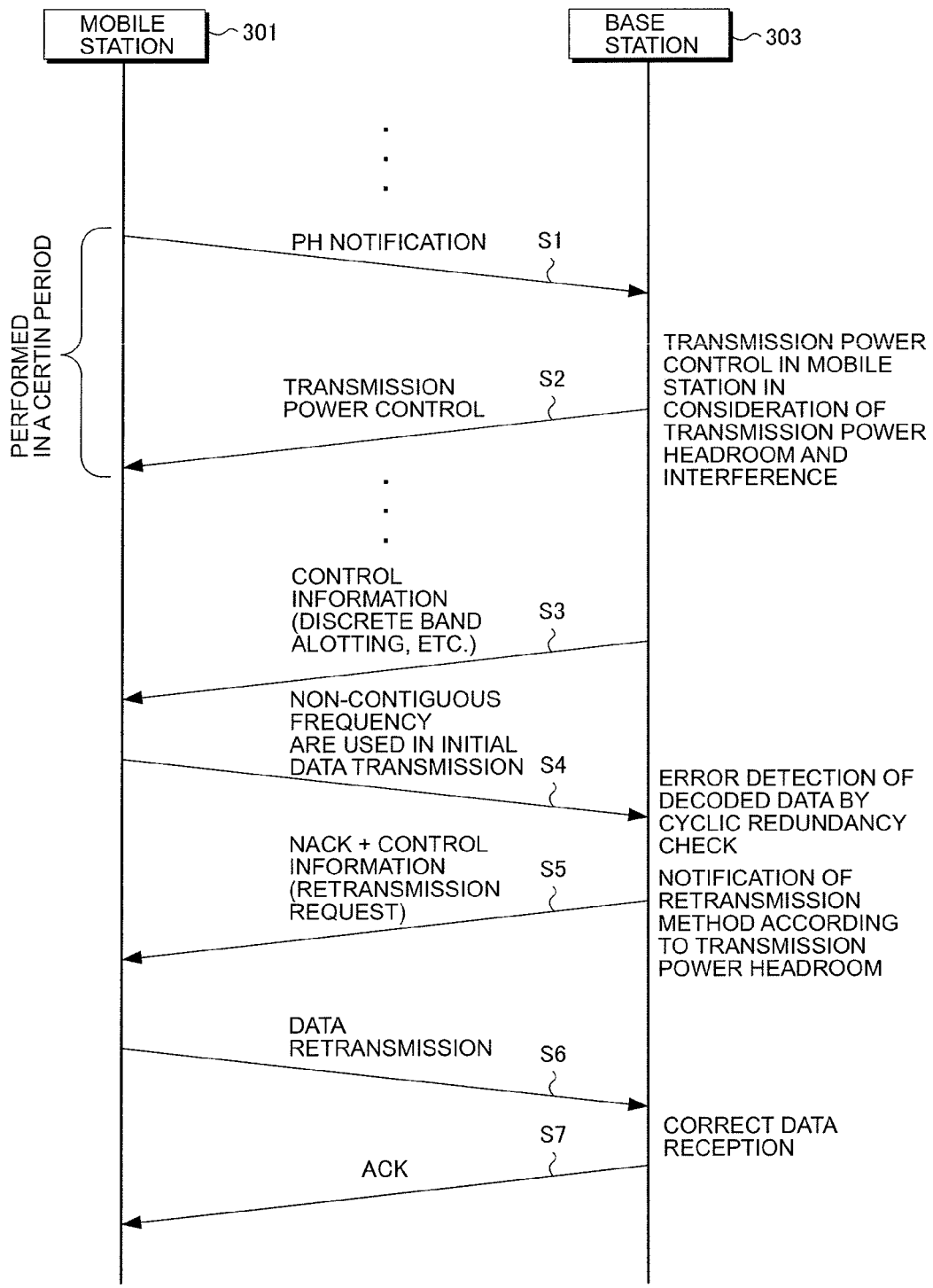
FIG. 3 is a diagram illustrating retransmission processing of a first embodiment.

FIG. 3 is a diagram illustrating retransmission processing of the first embodiment. The mobile station 301 periodically notifies the base station 303 of a PH as the control information (Step S1). In contrast, the base station 303 determines the transmission power of the mobile station 301 in consideration of interference with a mobile station 301 within the same cell as that of the PH, notification of which has been received from the mobile station 301, and notifies the mobile station 301 thereof (Step S2).

Figure 4:
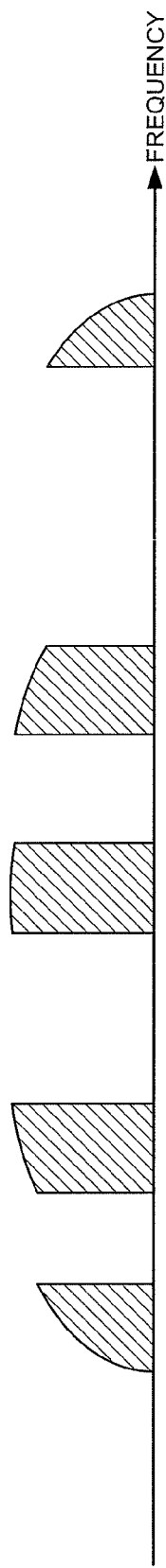
FIG. 4 is a diagram illustrating transmission power when a mobile station transmits data using non-contiguous frequency bands.

FIG. 4 is a diagram illustrating transmission power when the mobile station 301 transmits data by using non-contiguous frequency bands. In FIG. 3, when the mobile station 301 performs data transmission, the base station 303 transmits control information, which includes the information of allocating non-contiguous frequency, to the mobile station 301 (Step S3). The mobile station 301 transmits data by using the non-contiguous frequency bands as shown in FIG. 4 based on to the received control information (Step S4).

Figure 5:
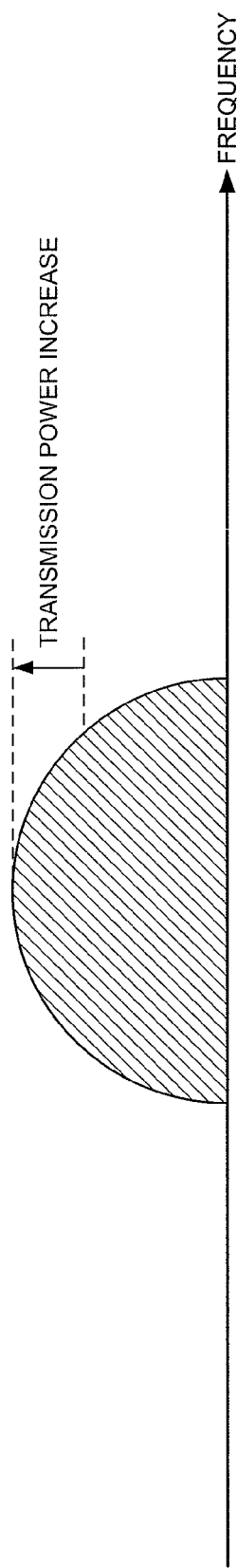
FIG. 5 is a diagram illustrating transmission power when a mobile station transmits data by increasing the transmission power through the use of contiguous frequency bands.

FIG. 5 is a diagram illustrating the transmission power when the mobile station 301 transmits data by increasing the transmission power through the use of the contiguous frequency bands. In FIG. 3, when the base station 303 has detected an error by the CRC in the data obtained by the decoding of the reception signal, the base station 303 transmits NACK which is a retransmission request (Step S5). Furthermore, when there is a transmission power headroom smaller than the PH, of which the mobile station 301 notifies the base station 303 periodically, the base station 303 determines the allocation of the contiguous frequency bands which is a transmission method having a lower peak power. By the allocation of the contiguous bands, a required back-off amount becomes small, the transmission power headroom becomes sufficient, and thus the increase in the transmission power becomes possible as shown in FIG. 5.

In FIG. 3, the base station 303 notifies the mobile station 301 of the frequency allocation information and the transmission power as control information in Step S5. The mobile station 301 performs the retransmission based on the received control information (Step S6), and the base station 303 transmits ACK in return if the base station has been able to receive the data correctly (Step S7).

Figure 6:
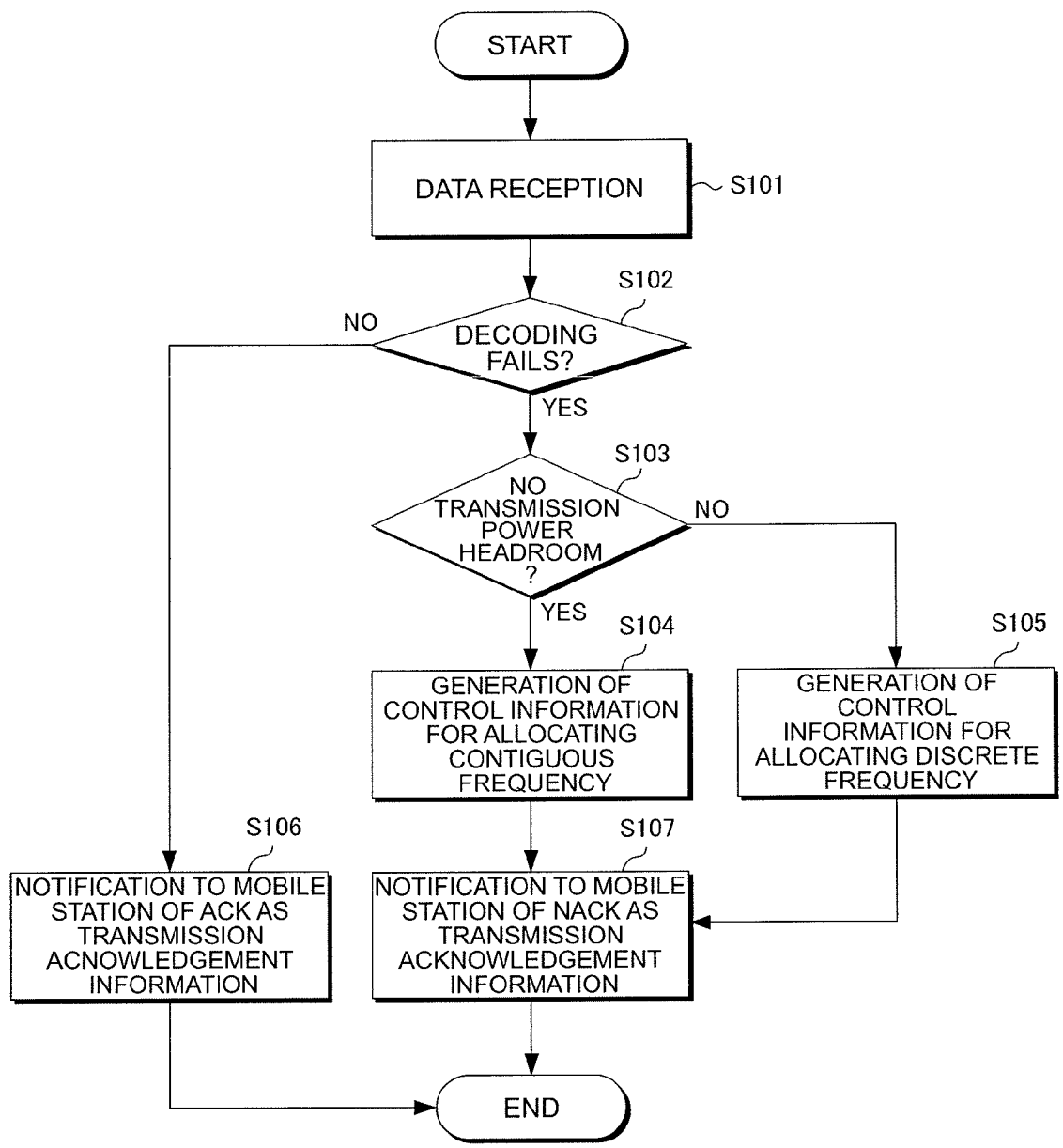
FIG. 6 is a flowchart of a determination method for control information a base station transmits at the time of a retransmission request of a first embodiment.

FIG. 6 is a flowchart of a determination method for control information the base station 303 transmits at the time of the retransmission request of the first embodiment. The base station 303 receives the data transmitted through the use of the non-contiguous frequency (Step S101). The base station 303 decodes the received data and determines whether or not the decoding has been performed correctly by detecting an error by the CRC (Step S102). When the decoding has succeeded, the base station 303 notifies the mobile station 301 of ACK as the acknowledgement signal (Step S106).

When the decoding has failed, the base station 303 confirms whether or not there is a transmission power headroom, based on the PH, notification of which has been received from the mobile station 301 (Step S103). When there is a transmission power headroom, the base station 303 generates the control information of allocating the non-contiguous frequency (Step S105). The allocation of the non-contiguous frequency may be the same as that in the initial data transmission or may be changed. Furthermore, since there is a transmission power headroom, the base station 303 may transmit the control information of increasing the transmission power, to the mobile station 301. When there is not a transmission power headroom, the base station 303 generates the control information of the contiguous frequency allocation and the transmission power (Step S104). The base station 303 notifies the mobile station 301 of the generated control information and NACK which is the transmission acknowledgement signal (Step S107).

By applying the present embodiment, it is possible to suppress the increase of the retransmission due to a shortage of the transmission power and to improve the cell throughput, since the base station 303 changes the transmission method of the retransmission in consideration of a transmission power headroom when the base station 303 has detected an error in the transmission of the non-contiguous frequency bands performed by the mobile station 301 through the use of one transmission antenna. While, in the present embodiment, the allocation is changed to the contiguous frequency allocation when there is not a transmission power headroom and the contiguous frequency allocation is used when there is a transmission power headroom, multiple carriers may be used when there is a transmission power headroom and the retransmission may be performed by a single carrier when there is not a transmission power headroom. Furthermore, while the base station 303 is configured to notify the mobile station 301 of the control information including the change to the contiguous frequency allocation and the transmission power at the time of the retransmission, a predetermined value may be used as the transmission power at the time of the retransmission, if the transmission power is smaller than an increased amount of the transmission power headroom.

Second Embodiment

In a second embodiment, there will be explained an example in which, when the mobile station 301 performs data transmission by Clustered DFT-S-OFDM, the mobile station 301 changes the bands to be allocated in consideration of a transmission power headroom, increases the transmission power by margin for the back-off, and switches to a transmission antenna 605 having a higher channel gain, at the time of the retransmission. While in the present invention, the number of the transmission antennas 605 is set to be one in the initial transmission, a case in which the plurality of transmission antennas 605 is used can also be applied.

Figure 7:
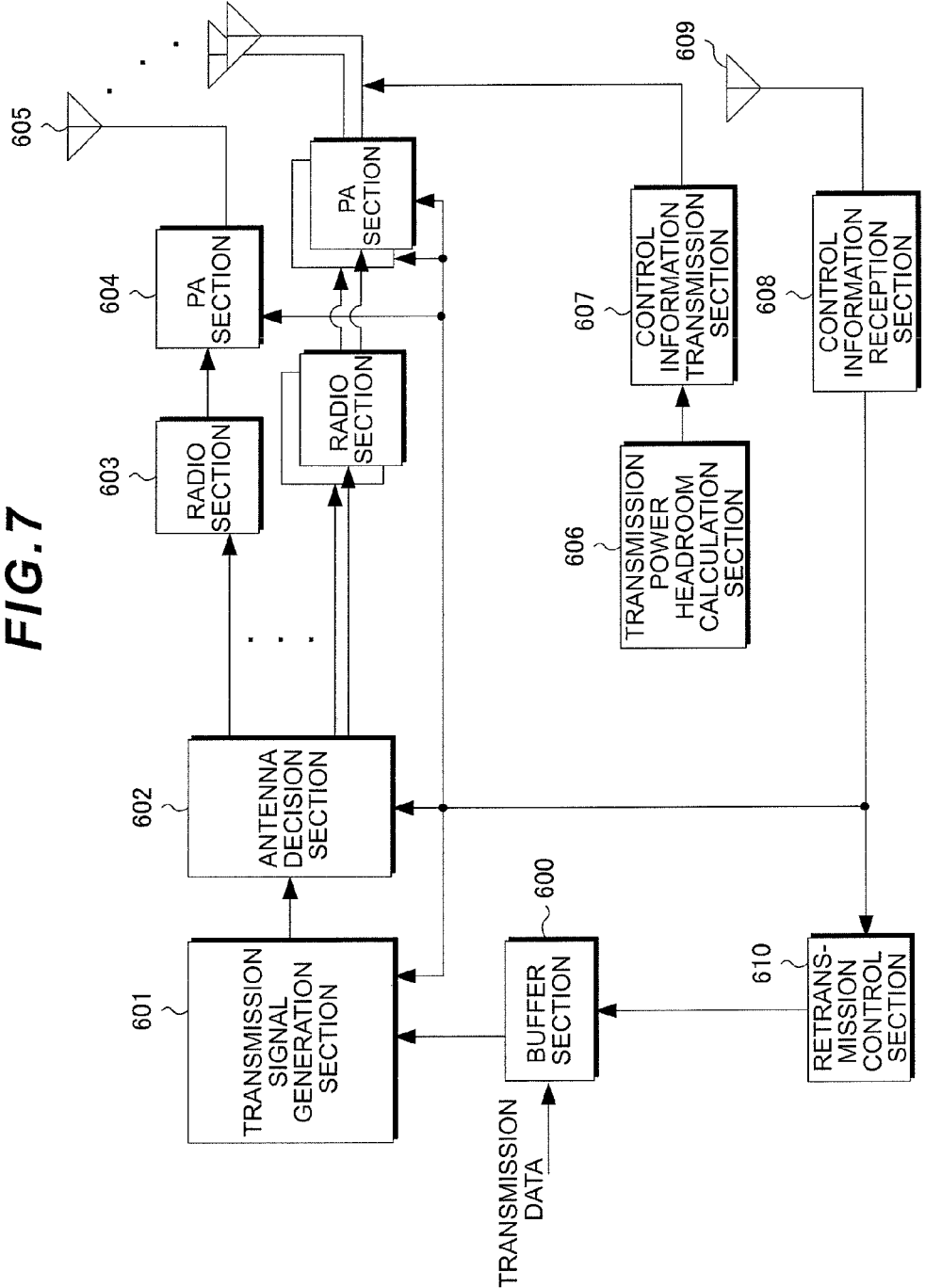
FIG. 7 is a block diagram illustrating an outline configuration example of a mobile station according to a second embodiment.

FIG. 7 is a block diagram illustrating an outline configuration example of a mobile station according to the second embodiment. The mobile station 301 has a plurality of antennas and, for the transmission antenna 605, the mobile station 301 is provided with a buffer section 600, a transmission signal generation section 601, an antenna determination section 602, a radio section 603, a PA section 604, a transmission power headroom calculation section 606, a control information transmission section 607, a control information reception section 608, a reception antenna 609, and a retransmission control section 610. For transmission antennas 605' and 605" excluding the transmission antenna 605, the mobile station 301 similarly includes respective radio sections 603' and 603" and respective PA sections 604' and 604".

The mobile station 301 receives control information with the reception antenna 609. The control information reception section 608 obtains the transmission acknowledgement signal of ACK or NACK and the control information indicating the frequency allocation information, the retransmission antenna information, the transmission power at the time of the retransmission, and the like, from the received control information.

The control information reception section 608 inputs the transmission acknowledgement signal to the retransmission control section 610, inputs the frequency allocation information to the transmission signal generation section 601, inputs the retransmission antenna information to the antenna determination section 602, and inputs the transmission power at the time of the retransmission to the PA section 604. The retransmission control section 610 inputs transmission data input to the buffer section 600, to the transmission signal generation section 601 when the transmission acknowledgement signal exhibits ACK, and inputs, for retransmission, transmission data, which has not been able to be received correctly by the base station 303 and which is stored in the buffer, to the transmission signal generation section 601 when the transmission acknowledgement signal exhibits NACK. The transmission signal generation section 601 subjects the input transmission data to the same processing as the processing from coding section 101 to the CP insertion section 108 in FIG. 1, and inputs the transmission data to the antenna determination section 602. The antenna determination section 602 selects a transmission antenna 605 for the retransmission which is indicated by the retransmission antenna information input from the control information reception section 608, and inputs the transmission signal input from the transmission signal generation section 601 to the radio section 603 of the transmission antenna 605 for the retransmission.

Furthermore, the PA section 604 of the transmission antennas 605 to be used for the retransmission performs amplification based on the transmission power information, notification of which has been received from the base station 303, and transmits the retransmission data from the transmission antenna 605 to be used for the retransmission.

The configuration of the base station 303 is the same as that of FIG. 2, and the channel estimation section 213 inputs the retransmission antenna information and the channel information based on the plurality of antenna channels to the frequency allocation decision section. The frequency allocation decision section 214 determines the bands to be allocated based on the channel information, and inputs the frequency allocation information and the retransmission antenna information to the control information generation section 215. The frequency allocation information and the retransmission antenna information are converted into control information data in the control information generation section 215 and transmitted from the transmission antenna 219 via the control information transmission section 216.

Figure 8:
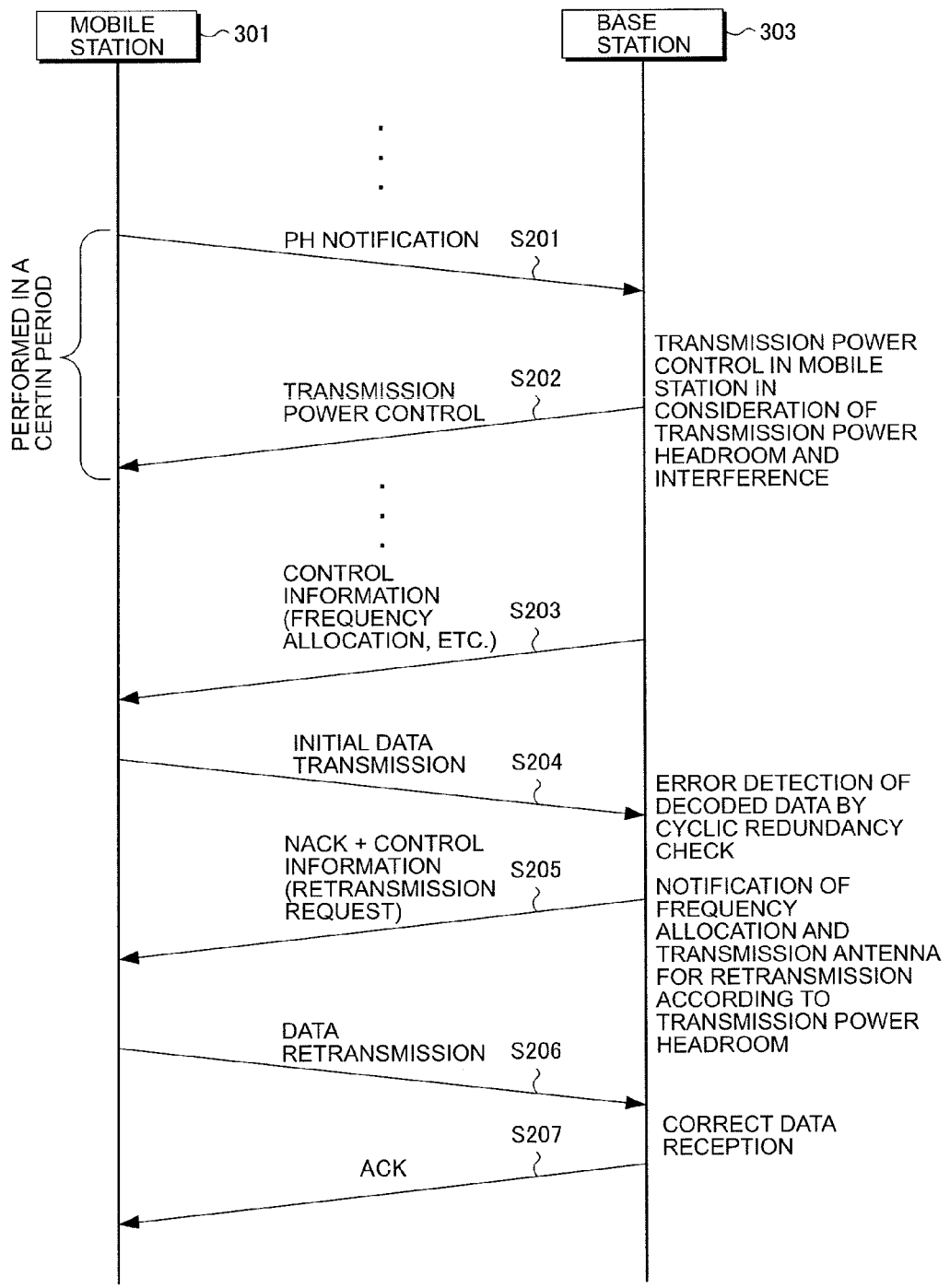
FIG. 8 is a diagram illustrating retransmission processing of a second embodiment.

FIG. 8 is a diagram illustrating retransmission processing of the second embodiment. The mobile station 301 periodically notifies the base station 303 of a PH as the control information (Step S201). In contrast, the base station 303 determines the transmission power of the mobile station 301 in consideration of interference with a mobile station 301 within the same cell as that of the PH, notification of which has been received, and notifies the mobile station 301 thereof (Step S202). When the mobile station 301 performs data transmission, the base station 303 transmits the control information, which includes the information of allocating the non-contiguous frequency, to the mobile station 301 (Step S203). The mobile station 301 transmits data by using the non-contiguous frequency bands based on the received control information (Step S204). The mobile station 301 performs the data transmission by using the non-contiguous frequency, and the base station 303 detects an error in the decoded result of the received data by the cyclic redundancy check. When the error has been detected and there is not a transmission power headroom in the PH, notification of which has been periodically received from the mobile station 301, the base station 303 allocates the contiguous bands, designates a transmission antenna 605 having a high channel gain, and performs retransmission request (Step S205). Since there is room for transmission power headroom, the transmission power at the time the retransmission is increased in consideration of a reception SINR (Signal to Interference and Noise power Ratio) which is a channel gain of the antenna used for the retransmission. The mobile station 301 performs the retransmission based on the received control information (Step S206), and the base station 303 transmits ACK in return when the data has been able to be received correctly (Step S207).

By applying the present embodiment, it is possible to suppress the increase of the retransmission due to a shortage of the transmission power and to improve the cell throughput by the antenna diversity effect, since the base station 303 changes the transmission method for the retransmission and the transmission antenna 605 in consideration of a transmission power headroom when the base station 303 has detected an error in the transmission performed by the mobile station 301 through the use of the non-contiguous frequency bands.

Third Embodiment

In a third embodiment, there will be explained an example in which, when a mobile station 301 performs data transmission by Clustered DFT-S-OFDM, the mobile station 301 changes the bands to be allocated in consideration of a transmission power headroom and increases the transmission power by margin for the back-off, at the time of the retransmission, and switches the number of transmission antennas 905 to be used for the retransmission. While in the present embodiment, the number of the transmission antennas 905 in the mobile station 301 is set to be two at the time of the retransmission, even three or more transmission antennas 905 used for the retransmission can be applied. Furthermore, while in the present embodiment, the number of transmission antennas 905 for the initial transmission is set to be one, the use of a plurality of transmission antennas 905 can also be applied.

Figure 9:
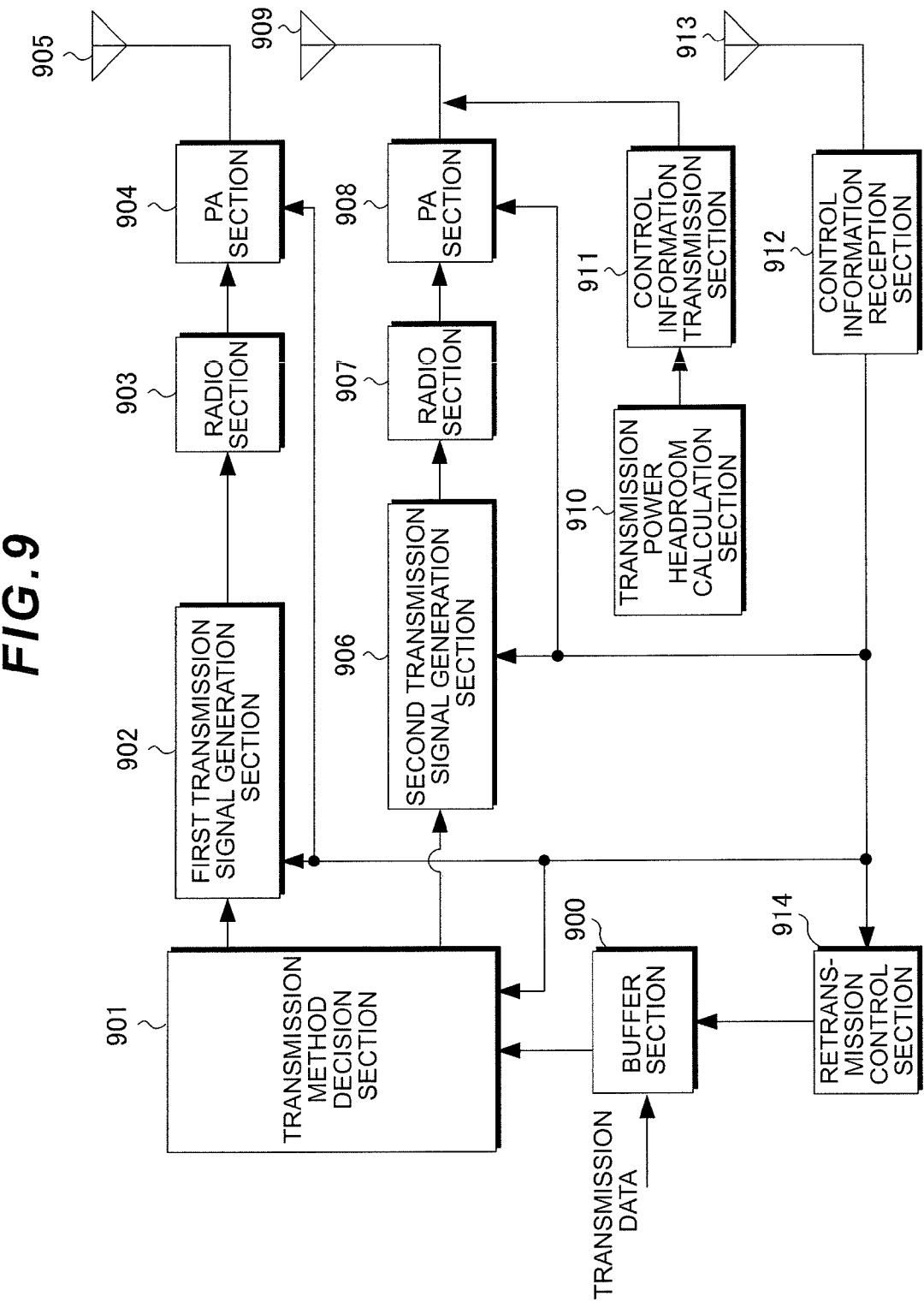
FIG. 9 is a block diagram illustrating an outline configuration example of a mobile station according to a third embodiment.

FIG. 9 is a block diagram illustrating an outline configuration example of a mobile station according to the third embodiment. The mobile station 301 is provided with a buffer section 900, a transmission method determination section 901, a first transmission signal generation section 902, a radio section 903, a PA section 904, a transmission antenna 905, a second transmission signal generation section 906, a radio section 907, a PA section 908, a transmission antenna 909, a transmission power headroom calculation section 910, a control information transmission section 911, a control information reception section 912, a reception antenna 913, and a retransmission control section 914.

The mobile station 301 uses one transmission antenna 905 and receives the transmission acknowledgement signal that is control information, with the reception antenna 913, after having performed the data transmission through the use of the non-contiguous frequency. The control information reception section 912 obtains the transmission acknowledgement signal of ACK or NACK and control signal indicating the frequency allocation information, the number of the transmission antennas, and the like, from the received signal.

The control information reception section 912 inputs the transmission acknowledgement signal to the retransmission control section 914, inputs the information of the number of retransmission antennas to the transmission method determination section 901, inputs the frequency allocation information to the first transmission signal generation section 902 and the second transmission signal generation section 906, and inputs transmission powers of the transmission antennas 905 and 909 to the PA section 904 and the PA section 908, respectively. When the transmission acknowledgement signal exhibits ACK, transmission data input to the buffer section 900 is input to the transmission method determination section 901, and, when the transmission acknowledgement signal exhibits NACK, transmission data which has not been able to be received correctly in the base station 303 and which is stored in the buffer is input to the transmission method determination section 901, for retransmission.

When the retransmission data and the number of the retransmission antennas are input and the number of antennas is two or more, the transmission method determination section 901 applies predetermined transmission diversity such as CDD (Cyclic Delay Diversity) and SFBC (Space Frequency Block Code). The first transmission signal generation section 902 inputs the information whether or not the transmission diversity is applied and the retransmission data, input from the transmission method determination section 901 and performs the same processing as the processing from the coding section 101 to the CP insertion section 108, in FIG. 1. The transmission signal is up-converted by the radio section 903, is amplified by the PA section 904 based on the transmission power information, notification of which has been received from the control information reception section 912, and is transmitted from the transmission antenna 905.

In regard to the transmission antenna 909, in the same way as the transmission antenna 905, the retransmission processing is performed based on the information whether or not the transmission diversity is applied and based on the retransmission data input from the transmission method determination section 901.

The configuration of the base station 303 is the same as that of FIG. 2 and determination is performed whether or not the decoding has been performed correctly or not, by detecting an error in the decoded result of the received data by the CRC in the cyclic redundancy check section 211. When the cyclic redundancy check section 211 has determined that the received data is correct, the base station 303 transmits ACK via the transmission acknowledgement signal transmission section 218. When an error has been detected in the received data, the base station 303 transmits NACK via the transmission acknowledgement signal transmission section 218. Furthermore, the information such as the PH stored in the control information buffer section 220 is input to the frequency allocation decision section 214.

The frequency allocation decision section 214 determines the frequency allocation, the number of the transmission antennas 905, and a transmission power, to be used at the time of the retransmission based on the channel information input from the channel estimation section 213 and the control information such as a PH. The frequency allocation and the number of the transmission antennas 905 to be used at the time of the retransmission are transmitted as the control information via the control information generation section 215 and the control information transmission section 216. Here, since the peak power is reduced when the transmission method using the contiguous bands is employed at the time of the retransmission, the required back-off amount becomes small.

When the number of antennas used in the retransmission is $N_{ANT}$, the transmission power per one antenna is not set as $P_{TX}-\text{Log}(N_{ANT})$, but may be set as $P_{TX}-\text{Log}(N_{ANT})+\alpha$. However, $P_{TX}$ is the transmission power at the time of the initial transmission and a expresses a back-off amount difference between the case of using the bands non-contiguously and the case of using the bands contiguously.

While in the present embodiment, explanation has been done on the assumption that the transmission diversity is CDD, a diversity method such as SFBC can be applied. When SFBC is used, SFBC decoding is required after performing the multiplication of a weight in the channel compensation section 207.

Figure 10:
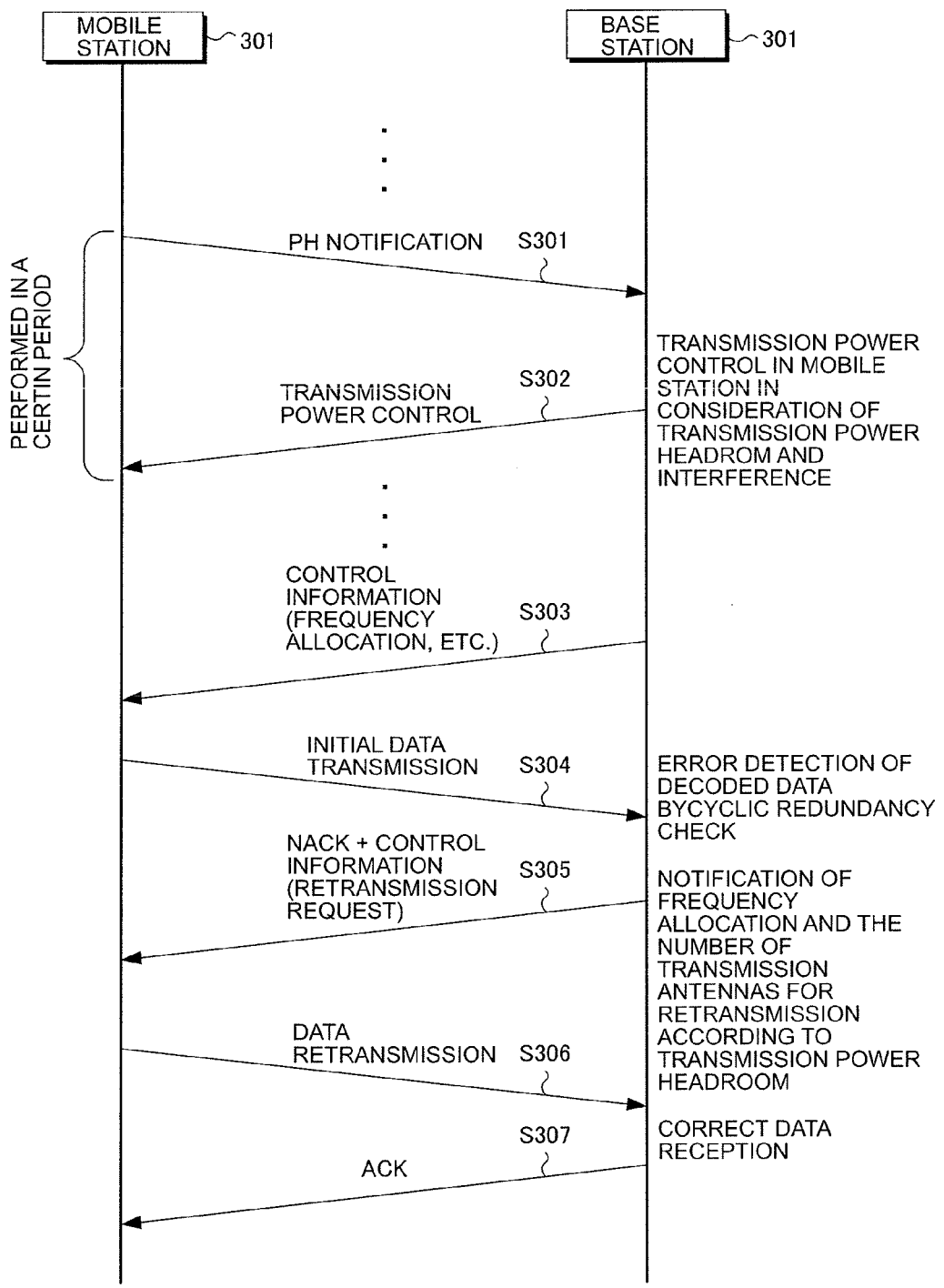
FIG. 10 is a diagram illustrating retransmission processing of a third embodiment.

FIG. 10 is a diagram illustrating the retransmission processing of the third embodiment. The mobile station 301 periodically notifies the base station 303 of a PH as the control information (Step S301). In contrast, the base station 303 determines the transmission power of the mobile station 301 in consideration of interference with a mobile station 301 within the same cell as that of the PH, notification of which has been received and notifies the mobile station 301 thereof (Step S302). When the mobile station 301 performs data transmission, the base station 303 transmits the control information, which includes information of allocating the non-contiguous frequency, to the mobile station 301 (Step S303). The mobile station 301 transmits data by using the non-contiguous frequency bands based on the received control information (Step S304). The mobile station 301 performs the data transmission by using the non-contiguous frequency and the base station 303 detects an error in the decoded result of the received data by the cyclic redundancy check. When an error has been detected and there is not a transmission power in the PH, notification of which has been periodically received from the mobile station 301, the base station 303 allocates the contiguous bands, designates the number of the retransmission antennas to be used for the transmission diversity, and performs retransmission request (Step S305). Since the required back-off amount of the transmission power used for the retransmission is reduced by the contiguous allocation, the transmission power of all the transmission antennas 905 used for the retransmission is increased as compared with the transmission power at the time of the initial transmission. The mobile station 301 performs the retransmission based on the received control information (Step S306), and the base station 303 transmits ACK in return when the data has been able to be received correctly (Step S307).

By applying the present embodiment, it is possible to suppress the increase of the retransmission due to a shortage of the transmission power and to improve the cell throughput by the transmission diversity effect, since the base station 303 changes the transmission method and the number of the transmission antennas 905 for the retransmission in consideration of a transmission power headroom when the base station 303 has detected an error at the time of the transmission through the use of the non-contiguous frequency bands by the mobile station 301.

DESCRIPTION OF THE REFERENCE NUMERALS

100 Buffer section
101 Coding section
102 Modulation section
103 DFT section
104 Transmission data allocation section
105 IDFT section
106 Reference signal generation section
107 Reference signal insertion section
108 CP insertion section
109 Radio section
110 PA section
111 Transmission antenna
112 Transmission power headroom calculation section
113 Control information transmission section
114 Control information reception processing section
115 Reception antenna
116 Retransmission control section
201 Reception antenna
202 Radio section
203 CP removal section
204 Reference signal separation section
205 DFT section
206 Transmission data extraction section
207 Channel compensation section
208 IDFT section
209 Demodulation section
210 Decoding section
211 Cyclic redundancy check section
213 Channel estimation section
214 Frequency allocation decision section
215 Control information generation section
216 Control information transmission section
217 Buffer section
218 transmission acknowledgement signal transmission section
219 Transmission antenna
220 Control information buffer section
301 Mobile station
303 Base station
600 Buffer section
601 Transmission signal generation section
602 Antenna determination section
603 Radio section
604 PA section
605 Transmission antenna
606 Transmission power headroom calculation section
607 Control information transmission section
608 Control information reception section
609 Reception antenna
610 Retransmission control section
900 Buffer section
901 Transmission method determination section
902 First transmission signal generation section
903 Radio section
904 PA section
905 Transmission antenna
906 Second transmission signal generation section
907 Radio section
908 PA section
909 Transmission antenna
910 Transmission power headroom calculation section
911 Control information transmission section
912 Control information reception section
913 Reception antenna
914 Retransmission control section

The invention claimed is:

1. A base station comprising:
a transmission section configured to transmit a first information indicating a retransmission request, a second information indicating any one access method among a plurality of access methods for retransmitting data and a third information indicating control information to control retransmission power for retransmitting the data simultaneously; wherein
the plurality of access methods are constituted by at least a first access method and a second access method which the first access method allocates a plurality of subcarriers continuously to form a single cluster of subcarriers and the second access method non-continuously allocates the plurality of subcarriers in at least a first cluster and a second cluster where the first cluster includes a first portion of the plurality of subcarriers continuously allocated to form the first cluster and where the second cluster includes a second portion of the plurality of subcarriers continuously allocated to form the second cluster, and
the first access method has PAPR characteristic different from the second access method.

2. The base station according to claim 1, wherein,
the third information indicates the control information for retransmitting by increasing the retransmission power.

3. The base station according to claim 1, wherein
in case of performing retransmission request to the mobile station, the transmission section is configured to transmit information indicating the first access method as the second information.

4. The base station according to claim 1, wherein
the transmission section configured to include two or more transmission antennas, and the transmission section is configured to transmit the data through changing the number of the transmission antennas to use.

5. A wireless communication system comprising:
a base station device; and
a mobile station, wherein
the base station comprises:
a transmission section configured to transmit a first information indicating a retransmission request, a second information indicating any one access method of a plurality of access methods for retransmitting data and a third information indicating control information to control retransmission power for retransmitting the data simultaneously, wherein
the plurality of access methods are constituted by at least a first access method and a second access method which the first access method allocates a plurality of subcarriers continuously to form a single cluster of subcarriers and the second access method non-continuously allocates the plurality of subcarriers in at least a first cluster and a second cluster where the first cluster includes a first portion of the plurality of subcarriers continuously allocated to form the first cluster and where the second cluster includes a second portion of the plurality of subcarriers continuously allocated to form the second cluster, and
the first access method has PAPR characteristic different from the second access method, wherein
the mobile station comprises:
a reception section configured to receive the first information, the second information and the third information, and
a radio section configured to retransmit the data to a base station by using an access method of the received second information.

6. The base station according to claim 1, wherein, the first access method indicates DFT-S-OFDM and the second access method indicates Clustered DFT-S-OFDM.

7. The base station according to claim 1, wherein the second information is determined according to a value of PH (Power Headroom).

8. A mobile station comprising:
a reception section configured to receive a first information indicating a retransmission request, a second information indicating any one access method of a plurality of access methods for retransmitting data and a third information indicating control information to control retransmission power for retransmitting the data simultaneously; and
a radio section configured to transmit the data to a base station by using an access method of the received second information, wherein
the plurality of access methods are constituted by at least a first access method and a second access method which the first access method allocates a plurality of subcarriers continuously to faun a single cluster of subcarriers and the second access method non-continuously allocates the plurality of subcarriers in at least a first cluster and a second cluster where the first cluster includes a first portion of the plurality of subcarriers continuously allocated to form the first cluster and where the second cluster includes a second portion of the plurality of subcarriers continuously allocated to form the second cluster, and
the first access method has PAPR characteristic different from the second access method.

9. The mobile station according to claim 8, wherein
the first access method indicates DFT-S-OFDM and the second access method indicates Clustered DFT-S-OFDM.

10. The mobile station according to claim 8, further comprising:
a control section configured to control retransmission power for retransmitting the data based on the received third information.

11. The mobile station according to claim 8, wherein
the radio section is configured to retransmit the data using the first access method in case of the radio section retransmits the data.

12. A control method for retransmitting data, the control method comprising:
transmitting a first information indicating a retransmission request, a second information indicating any one access method of a plurality of access methods for retransmitting the data and a third information indicating control information to control retransmission power for retransmitting the data simultaneously in case of performing retransmission request to a mobile station, wherein
the plurality of access methods are constituted by at least a first access method and a second access method which the first access method allocates a plurality of subcarriers continuously to form a single cluster of subcarriers and the second access method non-continuously allocates the plurality of subcarriers in at least a first cluster and a second cluster where the first cluster includes a first portion of the plurality of subcarriers continuously allocated to form the first cluster and where the second cluster includes a second portion of the plurality of subcarriers continuously allocated to form the second cluster, and
the first access method has PAPR characteristic different from the second access method.

13. A communication method for communicating with a base station, the communication method comprising:
receiving a first information indicating a retransmission request, a second information indicating any one access method of a plurality of access methods for retransmitting data and a third information indicating control information to control retransmission power for retransmitting the data simultaneously; and
retransmitting the data to the base station by using an access method of the received second information, wherein
the plurality of access methods are constituted by at least a first access method and a second access method which the first access method allocates a plurality of subcarriers continuously to form a single cluster of subcarriers and the second access method non-continuously allocates the plurality of subcarriers in at least a first cluster and a second cluster where the first cluster includes a first portion of the plurality of subcarriers continuously allocated to form the first cluster and where the second cluster includes a second portion of the plurality of subcarriers continuously allocated to form the second cluster, and the first access method has PAPR characteristic different from the second access method.

* * * * *

UNITED STATES PATENT AND TRADEMARK OFFICE
CERTIFICATE OF CORRECTION

PATENT NO. : 8,654,730 B2  
APPLICATION NO. : 13/377474  
DATED : February 18, 2014  
INVENTOR(S) : Jungo Goto et al.

Page 1 of 1

It is certified that error appears in the above-identified patent and that said Letters Patent is hereby corrected as shown below:

IN THE CLAIMS:

Claim 8, at column 17, line 66, change "faun" to --form--.

Signed and Sealed this  
Third Day of February, 2015

Michelle K. Lee  
*Deputy Director of the United States Patent and Trademark Office*